(12) United States Patent
Clark et al.

(10) Patent No.: US 8,312,150 B2
(45) Date of Patent: Nov. 13, 2012

(54) SYSTEM AND METHOD FOR FLEXIBLE DATA TRANSFER

(75) Inventors: Nicholas James Clark, Chesterfield, MO (US); William S. Woods, Florissant, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 691 days.

(21) Appl. No.: 11/937,925

(22) Filed: Nov. 9, 2007

(65) Prior Publication Data

US 2008/0065660 A1   Mar. 13, 2008

Related U.S. Application Data

(63) Continuation of application No. 10/909,279, filed on Jul. 30, 2004, now Pat. No. 7,313,576.

(51) Int. Cl.
*G06F 15/16* (2006.01)
*G06F 15/173* (2006.01)

(52) U.S. Cl. ........ 709/228; 709/203; 709/217; 709/225; 709/227

(58) Field of Classification Search .................... 709/228
See application file for complete search history.

(56) References Cited

U.S. PATENT DOCUMENTS

| | | |
|---|---|---|
| 4,319,321 A | 3/1982 | Anastas et al. |
| 5,315,709 A | 5/1994 | Alston, Jr. et al. |
| 5,805,832 A | 9/1998 | Brown et al. |
| 5,870,746 A | 2/1999 | Knutson et al. |
| 5,970,490 A | 10/1999 | Morgenstern |
| 6,014,670 A | 1/2000 | Zamanian et al. |
| 6,029,178 A | 2/2000 | Martin et al. |
| 6,032,147 A | 2/2000 | Williams et al. |
| 6,035,307 A | 3/2000 | Martin et al. |
| 6,085,196 A | 7/2000 | Motoyama et al. |
| 6,094,684 A | 7/2000 | Pallmann |
| 6,151,608 A | 11/2000 | Abrams |
| 6,178,418 B1 | 1/2001 | Singer |
| 6,341,290 B1 | 1/2002 | Lombardo et al. |
| 6,351,761 B1 | 2/2002 | Cantone et al. |
| 6,401,104 B1 | 6/2002 | LaRue et al. |
| 6,418,450 B2 | 7/2002 | Daudenarde |
| 6,477,561 B1 * | 11/2002 | Robsman ...................... 718/105 |

(Continued)

OTHER PUBLICATIONS

XML Whitepaper, "SQL Integrator," http://www.b2systems.com/zml/zmlwp.html (as of Aug. 16, 2000), B2Systems Inc. 1999.

(Continued)

*Primary Examiner* — Ian N Moore
*Assistant Examiner* — Jenee Alexander
(74) *Attorney, Agent, or Firm* — Jackson Walker L.L.P.

(57) ABSTRACT

A method and system for flexibly transferring data from one or more data sources to one or more data destinations within an information network where each of the one or more data sources have data in a particular source format and each of the one or more data destinations have data in the same or another particular destination format using a parameter database that includes parameters to control the transfer of data, a scheduler that initiates the transfer of data, and a data loader in communications with the parameter database and scheduler that, upon initiation by the scheduler, extracts data from the one or more data sources, manipulates the extracted source data into one or more destination formats associated with the one or more data destinations, and inserts the data into one or more data destinations according to the parameters within the parameter database.

11 Claims, 5 Drawing Sheets

U.S. PATENT DOCUMENTS

| | | | |
|---|---|---|---|
| 6,625,617 B2 | 9/2003 | Yarnall et al. | |
| 6,631,382 B1 | 10/2003 | Kouchi et al. | |
| 6,658,449 B1 * | 12/2003 | Brenner et al. | 709/226 |
| 6,708,189 B1 | 3/2004 | Fitzsimons et al. | |
| 6,714,979 B1 | 3/2004 | Brandt et al. | |
| 6,779,000 B1 * | 8/2004 | Northrup | 1/1 |
| 6,782,400 B2 | 8/2004 | Geuss et al. | |
| 6,795,868 B1 | 9/2004 | Dingman et al. | |
| 6,820,135 B1 | 11/2004 | Dingman et al. | |
| 7,137,115 B2 * | 11/2006 | Sakamoto et al. | 709/225 |
| 2002/0002560 A1 | 1/2002 | Shah et al. | |
| 2002/0099563 A1 | 7/2002 | Adendorff et al. | |
| 2002/0126812 A1 * | 9/2002 | Majewski et al. | 707/104.1 |
| 2002/0143862 A1 | 10/2002 | Peterson | |
| 2003/0135495 A1 * | 7/2003 | Vagnozzi | 707/3 |
| 2004/0002958 A1 * | 1/2004 | Seshadri et al. | 707/3 |
| 2004/0068481 A1 * | 4/2004 | Seshadri et al. | 707/1 |
| 2004/0133731 A1 * | 7/2004 | Sorrentino et al. | 711/100 |
| 2004/0139197 A1 * | 7/2004 | Blumenschein et al. | 709/225 |
| 2005/0125510 A1 * | 6/2005 | Kundu et al. | 709/220 |
| 2005/0234927 A1 | 10/2005 | Bande et al. | |
| 2006/0020701 A1 * | 1/2006 | Parekh et al. | 709/226 |
| 2006/0047717 A1 * | 3/2006 | Pereira | 707/204 |
| 2006/0251073 A1 | 11/2006 | Lepel et al. | |

OTHER PUBLICATIONS

XSL Transformations (XSLT), Version 1.0, W3C Recommendations (Nov. 16, 1999) (URL, as of Nov. 9, 2007, http://www.w3.org/TR/1999/REC-xslt-19991116).

TSI International Software Ltd., "Mercator E-Business Integration Broker Software in a SAP Environment," Version 2, Mar. 2000.

Lecluse, Christophe, "Event Driven or Tree Manipulation Approaches to SGML Transformation: You Should Not Have to Choose," http://www.us.balise.com/press/papers/lecluse/.htm (as of Jul. 28 2000), Nov. 1996.

Sterling Commerce White Paper, "Get Smart About File Transfer, An Analysis of the Risks and Best Practices in File Transfer Operations," pp. 1-10 (2003).

* cited by examiner

SYSTEM AND METHOD FOR FLEXIBLE DATA TRANSFER

RELATED APPLICATIONS

This application claims the benefit of U.S. patent application Ser. No. 10/909,279, filed on Jul. 30, 2004, which is hereby incorporated herein by reference in its entirety.

BACKGROUND

Today, digital information may be stored in various forms requiring various techniques to access and transfer the information. Depending on the type of data source, digital data may be stored within databases, flat files, spreadsheets, applications, or even data streams. Also, these different types of data sources may have different storage formats and different structures. For example, a relational database has a different structure than a hierarchical database. Furthermore, the data may be encoded differently depending on the data source. For example, one source may use ASCII while another uses binary coded decimal (BCD). In order to access information from these various data sources, it has generally been necessary to employ multiple applications to search the various data sources for the desired information.

Recently, however, data marts and warehouses have been developed that automatically and efficiently gather information, usually from multiple databases, into a commonly available database. More specifically, a data mart is a repository of data collected from various data sources that is designed to serve a particular group for a particular purpose. The data may be derived from one or more databases within an enterprise, a data warehouse, or some other specialized data source. A data warehouse is generally considered a central aggregation of data, i.e., a database, although it may be distributed physically. Data marts and warehouses essentially store information in a common format and location to enable an application to access the data conveniently.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

One embodiment of the present invention is a system that transfers data stored in flat files, some type of a relational database, or any information access scheme such as XML streams or web services. The embodiment allows data to be transferred to a separate target or destination database, while giving the system the ability to manipulate the data "on the fly" as the transfer is occurring. The flexible data transfer system runs in such a manner that any errors during a transfer or anomalies at a data source are corrected automatically without user intervention.

Figure 1:
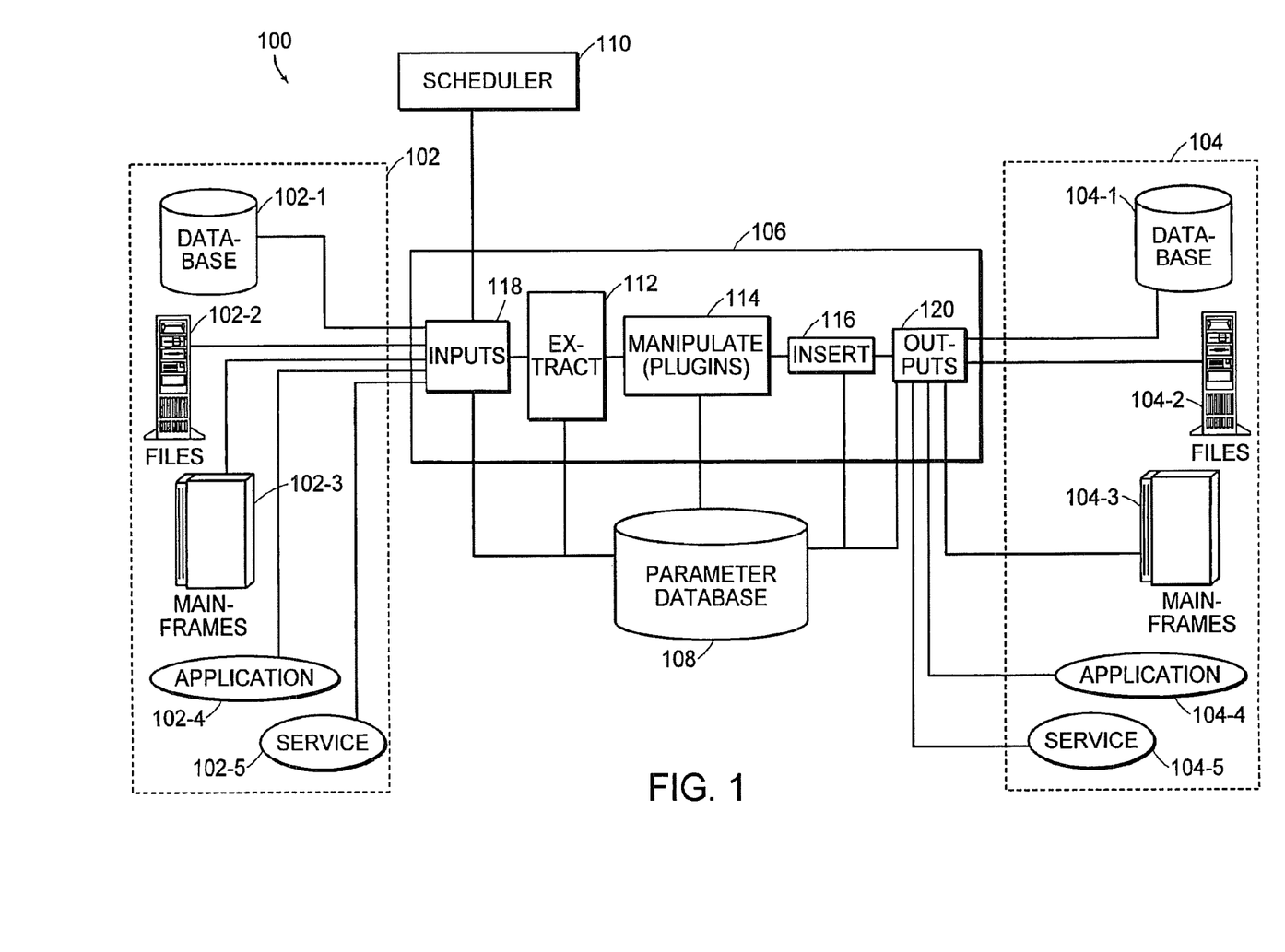
FIG. 1 is a schematic diagram showing a flexible data transfer system.

As shown in FIG. 1, the data transfer system 100 includes: 1) data sources 102 that may be any combination of data stored in relational database 102-1, data files 102-2, mainframe files 102-3, application data 102-4, or service data 102-5, which may be accessed through standard means of communications to those data sources, 2) data destinations 104 (i.e., targets) that are the destinations of the data after being transferred and/or manipulated by the data loader 106 which may include any relational database 104-1, data file 104-2, mainframe file 104-3, application data 104-4 or service data 104-5, and 3) data loader 106 having access to parameters further interfacing with a scheduler 110.

The parameters for data loader 106 may be stored in any data storage medium, but typically are stored in a relational database such as database 108. The parameter database 108, independent from any of the source and destination database preferably contains the parameters used for data manipulation by the data loader 106. All parameters relating to data system location, data types, scheduling, host names, locations, relational database access parameters and security may be housed in parameter database 108. For the purposes of this application, it should be understood that the terms "system" and "architecture" may be used interchangeably when referring to the flexible data transfer system 100 of the present invention.

Data loader 106 provides three functions: 1) extraction from one or more data sources 102, 2) data manipulation, and 3) output or insertion into a one or more data destinations 104, i.e., target systems. These phases may be implemented by functionally distinct elements such as extractor 112, manipulator 114, and inserter 116 that may be subroutines or functions of a data loader 106 process or software application, or be physically independent hardware components within a single or distributed computer system.

The data transfer system 100 preferably keeps the data manipulation and the data-specific operations separated from an underlying structure that provides scheduling, redundancy, and data integrity validation.

Data validation is implemented at the plug-in level with the plug-in leveraging integrity checking features available for the particular data source. For example, a database can return the number of rows that a particular query will return, a file can be scanned to determine the number of records.

This separation typically allows new data manipulation plug-in modules to be added to extract new types of data, with each of the plug-ins inheriting the basic properties of data loader 106 without the need to re-configure or re-program the data loader 106 logic each time new data sources 102 or data destinations 104 are added. The data loader 106 may also allow data manipulation at multiple levels by specifying in parameter database 108 that the data source 102 and data destination 104 are the same entity, i.e., in the same location. This allows unlimited levels of data manipulation as needed, including the derivation of new data from data source 102 during the manipulation process.

Parameter database 108 typically includes the basic execution plan for data transfers, the locations of the data sources 102 from which data may be extracted, the location of data destinations 104 to which data is typically inserted, scheduling and frequency as well as the order and number of threads that extract data from the data sources 102. The parameter database 108 is independent of the data sources 102 and data destinations 104.

When a new data source 102 is being added, the user also typically adds a new plug-in (if needed) to data loader 106, and then inserts new data into parameter database 108 to indicate and identify the data source 102, data target or destination 104, amount of threading, scheduling, and the type of plug-in to be used. The same data manipulation plug-in module may be used by data loader 106 to manipulate data from multiple data sources 102.

The parameter database 108 may also store any information that needs to be stored by the data transfer system 100 beyond its execution. For example, if certain source data 102 is not present at the time expected by parameter database 108, data loader 106 may store information in parameter database 108 to allow the data transfer system 100 to attempt the transfer at a later time. The frequency and amount of time that data loader 106 retries the data extraction is also typically governed by parameter database 108.

Threading is controlled by the batch parameter. Batches are launched all at one time in threads, the number of threads can be controlled and varied by the number of members of that batch group, as defined in the batch parameter. All threads for a particular batch will complete before the next batch is launched.

Retry sessions are launched in the same manner as the transfer itself, with the transfer program accepting a parameter indicating retry or normal mode, if the transfer program is started in retry mode, it will load records from the retry data by the batch parameter and update records accordingly on success or failure. Frequency is driven by the needs of the user, but typically is several hours after the initial attempt and every few hours after that until successful.

The parameter database 108 controls the loading process of data loader 106. Parameter database 108 houses all of the information that decides what data is loaded from what data source 102 and to what data destination 104, and the order in which all of the loading operations are completed. The name/ location of the loading plug-in to be used for the particular loading operation is also housed in parameter database 108. Another feature of parameter database 108 and data loader 106 is the ability to batch together a particular group of loads.

By batching particular loading operations together, optimum performance may be achieved. For instance, if ten loading operations are to be completed, but a user needs to make sure that certain loading operations are completed before others start, a batch group number column in parameter database 108 may be used to break down or distribute the data loading into logical subsets. The data loader 106 then typically loads one group completely before starting on the next group. Using this technique, multiple loading operations may be carried out concurrently for efficiency purposes, but in a certain process order if one load depends on the completion of a previous load.

The parameter database 108 may also determine the data loading drivers and manipulation plug-in modules to be used. Each driver may be used by an input interface 118 or output interface 120 to communicate with the different types of data sources 102 and destination 104. For instance, a database driver is generally needed to communicate with a database such as databases 102-1 or 104-1.

Figure 2:
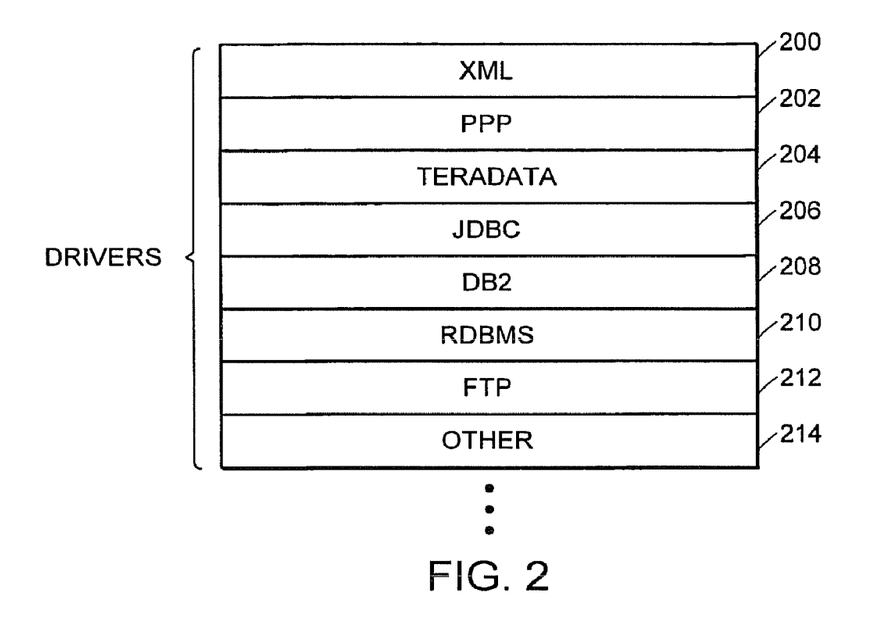
FIG. 2 is a block diagram of multiple drivers within a data loader.

Each driver typically encapsulates any specific code needed to communicate with a particular data source 102 or data destination 104. Often these drivers are provided by the supplier of the data source 102 or data destination 104 being accessed by data loader 106. As shown in FIG. 2, data loader 106 may include multiple data drivers that enable access to multiple types of data sources 102 and data destinations 104. For example, data loader 106 may include XML driver 200, PPP driver 202, proprietary Teradata driver 204, JDBC driver 206, DB2 driver 208, RDBMS driver 210, FTP driver 212, or any other driver 214 capable of enabling data loader 106 access to any other type of data source 102 or destination 104 via input interface 118 and output interface 120 respectively.

Figure 3:
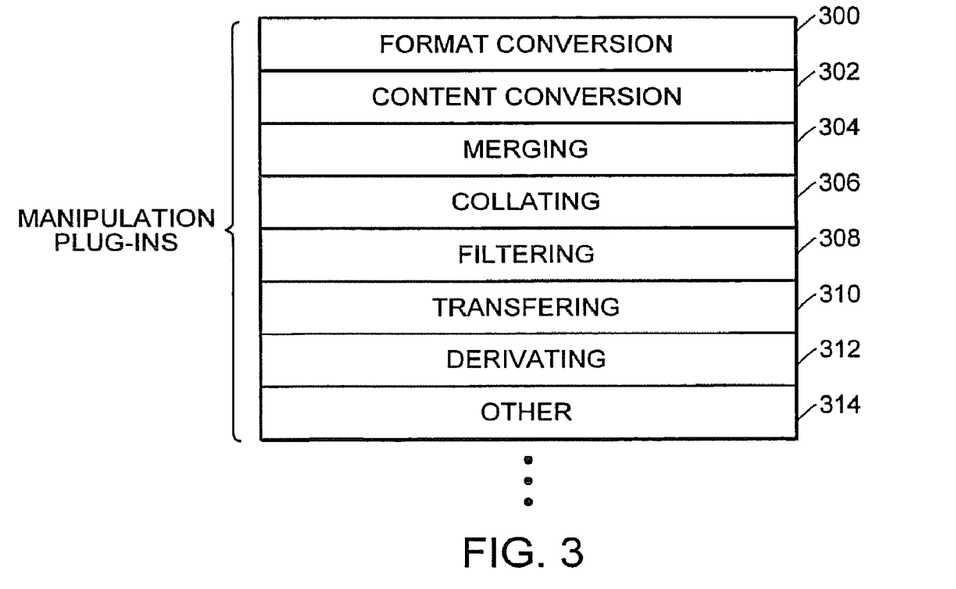
FIG. 3 is a block diagram of multiple data manipulation plug-ins for manipulating data within a data loader.

Each data manipulation plug-in module may be a custom loading routine, subroutine, process, or hardware component used to handle the particular type of data that is being loaded. These plug-ins can be reused as needed. They can contain anything from simple data format conversions, to complex computations, to connections to other sources of information to be blended with the data during the manipulation phase. As shown in FIG. 3, data loader 106 may include manipulation plug-ins such as format conversion module 300, content conversion module 302, data merging module 304, data collating module 306, data filtering module 308, data transferring module 310, data derivating module 312, and any other module 314 capable of converting data into the form and format required by a particular data destination 104.

For example, format conversion module 300 may convert data from an ASCII format to BCD format. Content conversion module 302 may use an algorithm or formula to convert data into new data, i.e., change the form of the data. For instance, content conversion module 302 may use source data such as a customer's outstanding balance and the prevailing interest rates to calculate a resulting monthly payment as the output data to be inserted at data destination 104. Data merging module 304 may, for example, combine a customer name from one data source 102 with the customer's address information from another data source 102 and output the combined data. Data collating module 306 may simply collect data from multiple data sources 102 into a combined data output. Data filtering module 308 may only output a portion of the data input from one or more data sources 102. Data transferring module 310 may simply output the received source data to certain data destinations 104. Data deviating module 312 may derive data such as metadata based on inputs from one or more data sources 102. For example, data deviating module 312 may identify trends or the frequency of access to certain data sources 102 and provide statistical data to certain data destinations 104. The type and number of data manipulation modules depends on the type of data sources 102 and the data formats and form of data required at the data destinations 104. Thus, other data manipulations modules 314 may be added to satisfy any custom needs. Furthermore, data modules may be added or removed as necessary to satisfy the flexibility and memory capacity capabilities of data loader 106.

Figure 4:
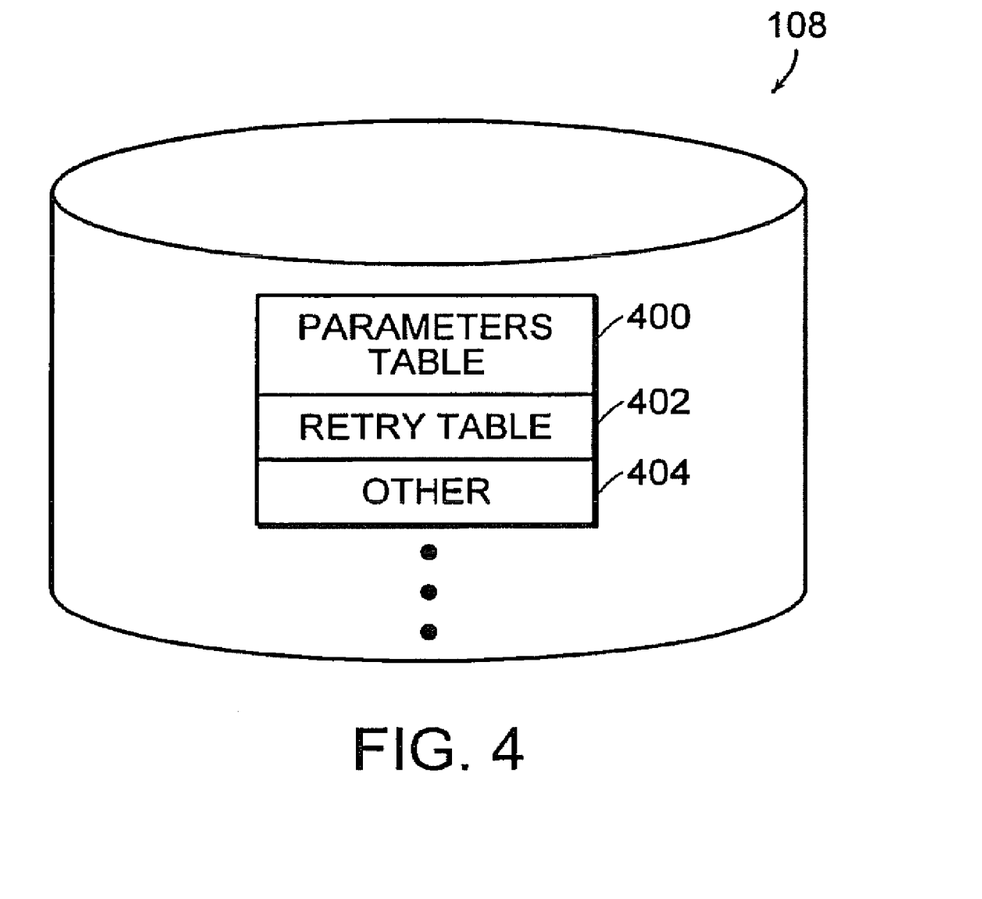
FIG. 4 is a block diagram of a parameter database that stores data manipulation parameters and data load retry information.

The particular plug-in being used may be specified in parameter database 108 and loaded at run time dynamically by data loader 106. Alternatively, data loader 106 may deliver source data to a remote plug-in for remote manipulation of the data and then return of the manipulated data to data loader 106. Plug-ins may be added to data loader 106 without affecting the rest of the data transfer system 100. Additional data types, data sources 102, and data destinations 104 may be extensibly handled by updating the parameters in a parameter table 400 within parameter database 108 as shown in FIG. 4. The updating of parameters table 400 preferably does not affect other data loading that is already in place.

Redundancy may be handled through a second retry table 402 that is typically very similar to the parameters table 400 in parameter database 108. In the case where data is either not online or available at the time that data loader 106 is attempting to load it, a retry record is typically added to retry table 402 within parameter database 108 to enable retry of the data load at a later time. The retry table 402 may be the same as the parameters table 400, except that instead of a date offset column, the retry table 402 may contain the date and time when the data was determined to be missing. This is needed because data can be retried over the course of several days and the offset may no longer be applicable. Parameter database 108 may also include other tables 404 to support data loader 106.

With the retry table 402, data loader 106 can keep track of any data that was not available at the original load time, and attempt to extract that data again at a later time. The data loader 106 may be configured to run the retry process at any interval that a user specifies. Also, reporting may be performed regarding the retry table 402 as needed to inform the user community or users of data loader 106 about data which is not available.

The parameters table 400 may include, but is not limited to the following fields:

1. Date offset—The date of the data to load relative to the current date
2. Data source host name—This is the name of the host that the data source resides on
3. Data source locator—In the case of a database, this would be the name of the database, in the case of a file, this could be the location, data set, directory, etc. . . .
4. Data Source name—the most refined name of the source data, could be a table name, file mask, application parameter, etc. . . .
5. Target host name—Same as source, but for the target
6. Target locator—Same as source, but for the target
7. Target name—Same as source, but for the target
8. Source user—User ID to be used on the source system
9. Source password—Password to be used on the source system
10. Target user—User ID to be used on the target system
11. Target password—Password to be used on the target system
12. Source driver—This is the driver used to attach to the particular source system for this load
13. Target driver—This is the driver used to attach to the particular target system for this load
14. Log location—a log of this operation can be kept, this column contains the logging information
15. Batch Group Number—loading operations are carried out in batches to attain peak efficiency, loads will be run in order of batch group number, all loads in the same batch will be launched at the same time and the next batch will not launch until all loads in the previous batch have finished. Note that a failed load that results in a retry at a later time will typically complete and not hold up subsequent loads.
16. Plug-in module—This defines what plug-in module will be used for this particular loading operation.

In the data extraction phase, source data may be extracted by data loader 106 from a data source 102 as governed or controlled by the parameters in parameter database 108. The data loader 106 may not only manipulate the scheduling and order that the data is extracted from data sources 102, but the number of independent threads that simultaneously extract data. For dramatically geographically diverse data sources 102, the number of simultaneous threads may be adjusted up or down to obtain the optimal rate of data extraction. This allows data loader 106 to be tuned to the particular situation in which it is deployed.

For example, if data loader 106 is running on a computer system that is geographically close to a data destination 104 and the data sources 102 from which data is being extracted are geographically distant from the data destination 104, multiple threads may be launched by data loader 106. Each thread may run independent instances of a particular data manipulation plug-in to make up for the transfer speed differential between the data source 102 and the data destination 104 by connecting to multiple data sources 102 at one time. Data may be extracted from multiple data sources 102 simultaneously, even if those sources do not exist on the same systems or types of systems.

The data manipulation phase may be optional and may vary in degree depending on the individual type of data being manipulated. Source data may be extracted by data loader 106 and inserted into one or more data destinations 104 without any manipulation, or it can be manipulated by one or more data manipulation plug-in modules. In other words, the manipulation may only be a transfer of data from a data source 102 to a data destination 104. However, some degree of manipulation is usually desired when moving data from a data source 102 to data destination 104. Thus, each type of data that is being extracted from a data source 102 may have a corresponding data manipulation module that is plugged into data loader 106 to allow that specific type of data to be manipulated in the way needed for a specific data destination 104.

The data manipulation modules used during a particular data transfer are, again, typically governed or controlled by the parameters in parameter database 108. These modules may be advantageously inserted into data loader 106 without changing the underlying structure and function of data loader 106 and may be launched in multiple threads according to parameter table 400 of parameter database 108. Data manipulation may involve anything from simple character, number, or date conversions to complex mathematical computations. In addition, the data manipulation modules may, themselves, make independent connections to other remote utility or translation files, databases, or applications to translate data being extracted from a data source 102.

The insertion phase involves data loader 106 inserting the data into one or more data destinations 104. The output to the data destination 104 may be in the form of a database insert, flat file or any web/online transaction processing service. All of the location/connection information about the data destinations 104 are preferably contained in the parameters table 400 of parameter database 108.

In certain embodiments, scheduler 110 determines when the transfer of data using data loader 106 may occur. Scheduler 110 may be a software application co-located on the same hardware platform as data loader 106. For example, data loader 106 may be a Java application running on a SUN Fire or Netra-family server while scheduler 110 may be another Java application running on the same server. Scheduler 110 may be a software, hardware, or firmware application running at some remote location that is able to initiate data loading by sending an initiate command to data loader 106. Scheduler 110 may even be a human operator that initiates a data loader 106 program. Scheduler 110 may further be a subroutine or function within the data loader 106 application. Preferably, scheduler 110 is a operating system (OS) process such as UNIX's Cron scheduler that may be configured by a UNIX administrator or system user to initiate data transfers using data loader 106 at pre-determined or periodic intervals.

Thus, one embodiment of the present invention includes a system 100 for flexibly transferring data from one or more data sources 102 to one or more data destinations 104 within an information network such as the Internet or an enterprise network. This data transfer may be performed even when each of the one or more data sources 102 have data in a particular source format while each of the one or more data destinations 104 have data in a different destination format. The data transfer system 100 includes a parameter database 108 that further includes parameters to control the transfer of data. A scheduler 110 typically determines when the transfer of data is to occur. Furthermore, a data loader 106 communicates with parameter database 108 and scheduler 110 to effect the transfer of data. Upon initiation by scheduler 110, data loader 106 typically extracts data from the one or more data sources 102, manipulates the extracted source data into one or more destination formats associated with one or more data destinations 104, and then inserts the data into one or more data destinations 104 according to the parameters within the parameter database 108.

The data loader 106 may include an input interface 118 that enables communications with one or more data sources 102 and an output interface 120 that enables communications with one or more data destinations 104. These interfaces may include one or more drivers to enable communications with one or more data sources 102 and destinations 104. For example, a driver may support data communications using XML, PPP, teradata, JDBC, DB2, RDBMS, FTP, or some other protocols used by either a data source 102 or destination 104. Input interface 118 and output interface 120 may be hardware components with dedicated firmware that implement one or more drivers. Preferably, input interface 118 and output interface 120 are one or more software drivers residing within the data loader 106 application.

Figure 5:
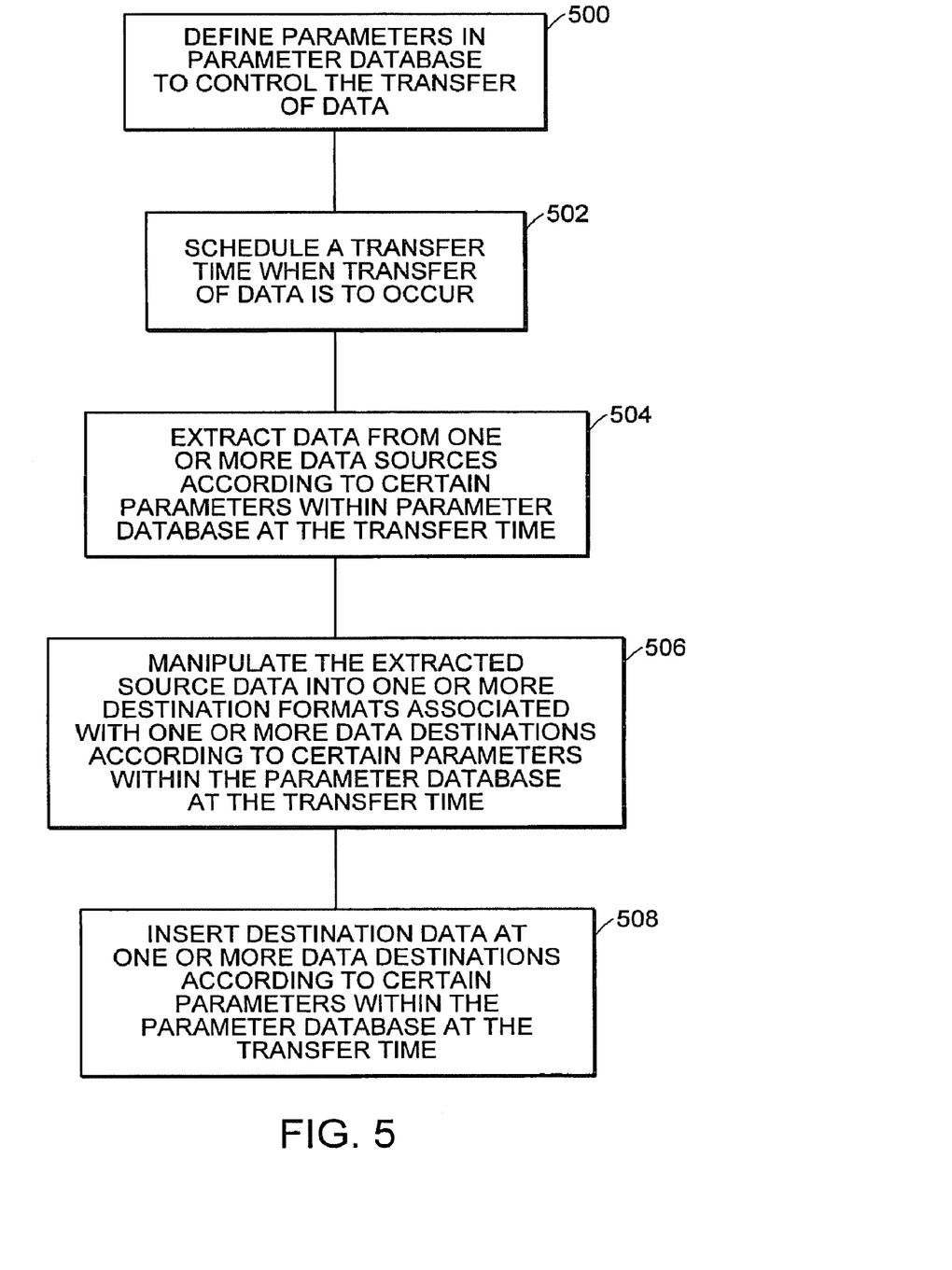
FIG. 5 is a flow chart of a procedure for transferring data from one or more data sources to one or more data destinations.

According to the foregoing, the present approach provides a method for transferring data from one or more data sources 102 to one or more data destinations 104 even when the source data has a different form or format than the required destination data form or format. As shown in FIG. 5, the method includes the following steps: defining parameters in a parameter database 108 to control the transfer of data (Step 500), scheduling a transfer time when the transfer of data is to occur (Step 502), extracting data from the one or more data sources 102 according to certain parameters within the parameter database 108 at the transfer time (Step 504), manipulating the extracted source data into one or more destination formats associated with one or more data destinations 104 according to certain parameters within the parameter database 108 at the transfer time (Step 506), and inserting the destination data at one or more data destinations 104 according to certain parameters within parameter database 108 at the transfer time (Step 508).

Figure 6:
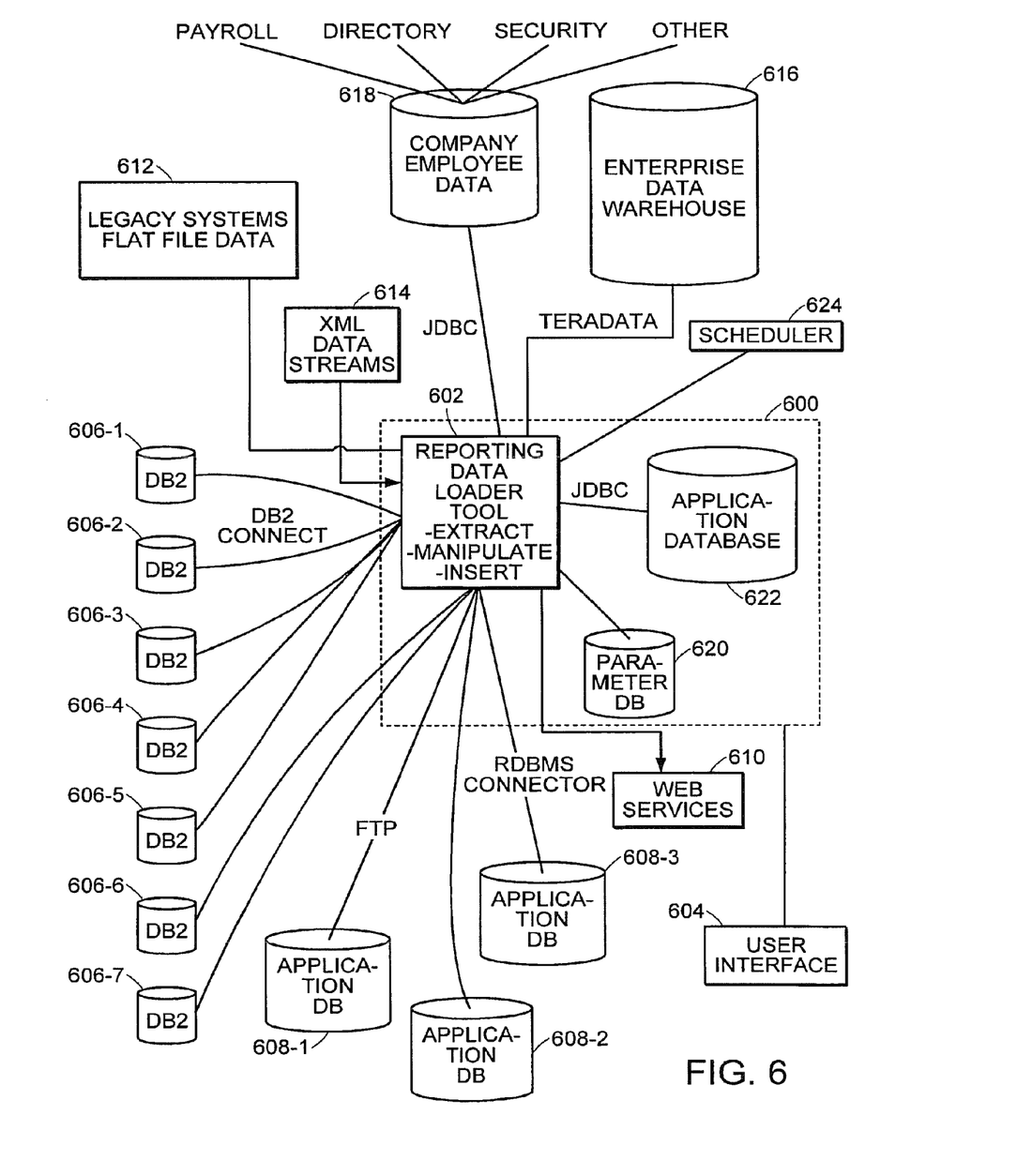
FIG. 6 is a block diagram of an exemplary reporting tool system that uses a report data loader tool to transfer data from multiple data sources to the reporting tool system.

FIG. 6 shows an exemplary reporting tool system 600 that uses reporting data loader tool 602 according to the principles of the present invention. The exemplary reporting tool 602 brings service order and error data from separate data sources across the enterprise into the reporting data transfer system 600. Reporting tool 602 users can then run reports over that data via user interface 604. In this exemplary implementation, there are numerous data sources and data source types used by the reporting data loader tool 602 application. For example, the data sources may include databases 606, application databases 608, web services 610, legacy systems flat file data 612, XML data streams 614, enterprise data warehouse 616, and company enterprise database 618 with data input from a company's payroll, directory, security, and other systems.

The reporting data loader tool 602 preferably runs on the same hardware platform or computer system as parameter database 620 and destination database 622 to maximize data transfer performance. For example, reporting tool 602, parameter database 620, and application database 622 may all reside on the same SUN UltraSparc workstation that is typically accessed by a user via user interface 604 to gather service and error reports from various sources. Reporting data loader tool 602 may be a Java application while parameter database 620 and application database 622 are typically relational databases loaded onto the same server platform. Scheduler 624 may also be co-located with reporting tool 602 and is preferably a UNIX system Cron scheduler within the OS supporting the reporting tool 602 application. Thus, the reporting tool system 600 preferably manages all of the data extraction in an automated fashion with minimal user intervention, and with outstanding error checking and correction abilities.

The parameter database 620 is preferably configured in such a way that several threads may be launched to different data sources or systems to achieve maximum data transfer performance. For example, certain service order error data may originate from seven separate systems located in five different geographic locations across the enterprise. Thus, reporting data loader tool 602 may make seven simultaneous connections to the seven source databases to allow the data to be loaded in parallel into the target application database 622. Without the parallel loading abilities, reporting tool system 600 may not be able to load all of the distributed data in a timely manner because there may be a short loading window from the time that the data is ready on the source systems until the users are logged into the report data loader tool 602 application. Multiple instances of the reporting data loader tool 602 may be deployed across an enterprise.

Thus, in an exemplary scenario, a user may configure parameter database 620 via user interface 604 with the name and location of various data sources such as database 606-1, company enterprise data 618, and XML data streams 614. The user may also load various data manipulation plug-in modules within reporting data loader tool 602 to enable the proper manipulation of data into the database format and content required by data destination application database 622. The user may also load the necessary drivers to enable reporting data loader tool 602 access to the various data sources and the data destination database 622. Furthermore, the user may configure the UNIX Cron scheduler to initiate the reporting data loader tool 602 application every morning at a fixed time before a reporting tool system 600 user accesses the transferred data. User interface 604 may be a server client terminal, another computer with remote access to the reporting data loader tool 602, a personal digital assistant (PDA), a wireless device with remote terminal interface, or any device capable to supporting user interaction with the reporting data loader tool 602.

Each of the databases 606 may be associated with service requests and error reports within a certain geographic region. Thus, if a reporting tool system 600 user is only interested in service requests and errors from a particular region, he may configure reporting data loader tool 602 to extract data from database 606-1 only. The user may also need associated information such as the responsible maintenance technician which may be retrieved from enterprise database 618 and perhaps real-time network error telemetry from XML data streams 614. Another user of another reporting tool system 600 may configure that system to transfer data from other data sources as required by the user.

Thus, every morning at a designated time, scheduler 624 typically initiates the reporting data loader tool 602 application that extracts data from select data sources, manipulates the data according to designated data manipulation plug-ins, and inserts the manipulated data into application database 622. The data collected within application database 622, which is updated on a daily basis, may then be accessed by users of reporting tool system 600.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of transferring data from a source to a destination, the method comprising:
  receiving, at a data loader, an indication of a data source;
  receiving an indication of a data destination;
  determining a first value indicative of a geographic distance between the data source and the data loader;
  determining a second value indicative of a geographic distance between the data destination and the data loader;
  determining a number of threads to be used by the data loader to transfer a source data object, wherein the number of threads is determined based, at least in part, on a geographic distance value selected from a group consisting of the first value and the second value; and
  employing the number of threads to transfer the source data object from the data source to the data destination;
  wherein the number of threads is determined to be one when the second value is greater than the first value; and
  wherein the number of threads is determined to be one when the second value is greater than the first value.

2. A method as defined in claim 1, wherein each of the number of threads employed to transfer the source data object is initialized simultaneously.

3. A method as defined in claim 1, wherein the data source is a first data source and wherein the method further includes receiving an indication of a second data source.

4. A method as defined in claim 3, wherein employing the number of threads to transfer the source data object comprises employing a first thread to transfer data from the first data source and employing a second thread to transfer data from the second data source.

5. A data loader server, comprising:
  a processor having access to a computer readable storage medium storing processor executable program instructions for transferring data from a source to a destination, the program instructions including instructions for:
    determining a first value indicative of a geographic distance between a data source and the data loader;
    determining a second value indicative of a geographic distance between a data destination and the data loader;
    determining a number of transfer threads based on a geographic distance value selected from a group consisting of the first value and the second value; and
    employing the number of threads to transfer a data object from the data source to the data destination;
  wherein the number of transfer threads is determined to be one when the second value is greater than the first value; and
  wherein the number of transfer threads is determined to be greater than one when the first value is greater than the second value.

6. The data loader server of claim 5, wherein each of the number of threads are initialized simultaneously.

7. The data loader server of claim 5, wherein the data object is a first data object and wherein employing the number of threads includes:
  employing a first transfer thread to transfer at least a portion of the first data object from the first data source; and
  employing a second transfer thread to transfer at least a portion of a second data object from a second data source.

8. An article of manufacture storing machine readable instructions which, when executed, cause a machine to:
  receive a first parameter identifying a data source;
  receive a second parameter identifying a data destination;
  determine a first value indicative of a geographic distance between a data source and a data loader;
  determine a second value indicative of a geographic distance between a data destination and the data loader;
  determine a number of data transfer threads corresponding to a source data structure based, at least, on the first value and the second value; and
  employ the number of data transfer threads to transfer the source data structure from the data source to the data destination;
  wherein the number of threads is one when the second value is greater than the first value; and
  wherein the number of threads is greater than one when the first value is greater than the second value.

9. The article of manufacture of claim 8, wherein each of the number of threads is initialized simultaneously.

10. The article of manufacture of claim 8, wherein the data source is a first data source, the source data structure is a first source data structure, and the instructions include instructions to determine a second source value indicative of a distance between a second data source and the data loader.

11. The article of manufacture of claim 10, wherein the instructions to employ include instructions to employ a first transfer thread to transfer at least a portion of the first source data structure and a second transfer thread to transfer at least a portion of a second source data structure from the second data source.

* * * * *